(12) United States Patent
Wang et al.

(10) Patent No.: US 8,072,186 B2
(45) Date of Patent: Dec. 6, 2011

(54) USB CHARGER CIRCUIT

(75) Inventors: Shih-Yuan Wang, Tainan (TW);
Yung-Hsin Chiang, Hsindian (TW);
Yu-Ming Hsu, Sanchong (TW)

(73) Assignee: Addtek Corp., Taipei (TW)

( * ) Notice: Subject to any disclaimer, the term of this patent is extended or adjusted under 35 U.S.C. 154(b) by 920 days.

(21) Appl. No.: 12/058,728

(22) Filed: Mar. 30, 2008

(65) Prior Publication Data
US 2009/0072796 A1 Mar. 19, 2009

(51) Int. Cl.
*H02J 7/04* (2006.01)
(52) U.S. Cl. ......... 320/140; 320/107; 320/162; 320/164
(58) Field of Classification Search .................... 320/140
See application file for complete search history.

(56) References Cited

U.S. PATENT DOCUMENTS 6,184,652 B1 * 2/2001 Yang .............................. 320/110
2006/0002154 A1 * 1/2006 Amrani et al. .................. 363/16

* cited by examiner

*Primary Examiner* — Edward Tso
*Assistant Examiner* — Johali Torres Ruiz
(74) *Attorney, Agent, or Firm* — Ming Chow; Sinorica, LLC (57) ABSTRACT

A USB charger circuit includes at least a converter, a control circuitry, a first resistor, a second resistor, an error amplifier, a sense resistor and a diode. The converter has a transistor. The control circuitry is coupled to the transistor. The control circuitry is used for producing a drive signal to the transistor. The first resistor is connected between the output node of the converter and a first node. The second resistor is connected between the first node and a second node. The error amplifier is coupled to receive a voltage divided by the first resistor and the second resistor to compare to a reference voltage. The sense resistor is connected between the second node and ground. The diode is connected between the output node of the converter and a first node.

7 Claims, 12 Drawing Sheets

Fig. 12

USB CHARGER CIRCUIT

BACKGROUND OF THE INVENTION

1. Field of the Invention

This invention relates generally to power supplies and more particularly, to power supplies having a regulated output.

2. Description of Prior Art

Conventional charger utilizing USB port adopts linear regulator for its charging technology. Conventional linear regulator provides stable output voltage. The output voltage is lower than the unregulated input voltage. The linear regulators offer a number of advantages, one of which is good regulation with low cost. However, they also suffer from several drawbacks, the primary one of which is inefficiency. Power that is not consumed by the load is dissipated as heat. Situations that combine high heat and insufficient heat dissipation may result in a rapid and extreme rise in body temperature. It may cause serious system malfunctioning and reliability issues. Moreover, the charging current is confined by the input end of the USB port. Therefore, it takes long time to fully charge the battery.

SUMMARY OF THE INVENTION

The present invention provides a USB charger circuit to resolve the foregoing problems faced by the conventional USB charger. The present invention also has the advantage of providing a high efficiency transformation and excellent heat dissipation.

In accordance with an aspect of the present invention, a USB charger circuit includes at least a converter, a control circuitry, a first resistor, a second resistor, an error amplifier, a sense resistor and a diode. The converter has a transistor. The control circuitry is coupled to the transistor. The control circuitry is used for producing a drive signal to the transistor. The first resistor is connected between the output node of the converter and a first node. The second resistor is connected between the first node and a second node. The error amplifier is coupled to receive a voltage divided by the first resistor and the second resistor to compare to a reference voltage. The sense resistor is connected between the second node and ground. The diode is connected between the output node of the converter and a first node.

In the preferred embodiment of the invention, the converter is a Sepic converter or a buck converter. The diode is a zener diode. The switch is a NMOS transistor.

In accordance with another aspect of the present invention, another USB charger circuit comprises a converter, a control circuitry, a first resistor, a second resistor, an error amplifier, a sense resistor, an off-state resistor, a first diode, a second diode, a third resistor and a second transistor. The converter has a first transistor. The control circuitry is coupled to the first transistor. The control circuitry produces a drive signal to the first transistor. The first resistor is coupled between an output node of the converter and a first node. The second resistor is coupled between the first node and a second node. The error amplifier is coupled to receive a voltage divided by the first resistor and the second resistor to compare to a reference voltage. The sense resistor is coupled between the second node and a third node. The off-state resistor is coupled between the third node and ground. The first diode is coupled between the output node of the converter and a first node. The second diode is coupled between the output node of the converter and a forth node. The resistor is coupled between the forth node and ground. The second transistor has a gate coupled to the forth node, a source coupled to ground, and a drain coupled to the third node.

In the preferred embodiment of the invention, the converter is a Sepic converter or a buck converter. The first diode is a zener diode. The second diode is a zener diode. The first transistor is a NMOS transistor. the second transistor is a NMOS transistor.

In accordance with a further aspect of the present invention, a further USB charger circuit comprises a converter, a control circuitry, a first resistor, a second resistor, a second transistor, an error amplifier, a sense resistor, a fifth resistor, a first diode, a second diode and a forth resistor. The converter has a first transistor. The control circuitry is coupled to the first transistor. The control circuitry produces a drive signal to the first transistor. The first resistor is coupled between an output node of the converter and a first node. The second resistor is coupled between the first node and a second node. The second transistor has a gate coupled to a forth node, a source coupled to a third node, and a drain coupled to the second node. The error amplifier is coupled to receive a voltage divided by the first resistor and the second resistor to compare to a reference voltage. The sense resistor is coupled between the third node and ground. The fifth resistor is coupled between the first node and ground. The first diode is coupled between the output node of the converter and the first node. The second diode is coupled between the output node of the converter and a forth node. The forth resistor is coupled between the forth node and the third node.

In the preferred embodiment of the invention, the converter is a Sepic converter or a buck converter. The first diode is a zener diode. The second diode is a zener diode. The first transistor is a NMOS transistor. The second transistor is a NMOS transistor.

The present invention may best be understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purpose of illustration and description only. It is not intended to be exhaustive or to be limited to the precise form disclosed.

According to the first preferred embodiment of the present invention, a USB charger circuit includes at least a converter, a control circuitry, a first resistor, a second resistor, an error amplifier, a sense resistor and a diode. The converter has a transistor. The control circuitry is coupled to the transistor. The control circuitry is used for producing a drive signal to the transistor. The first resistor is connected between the output node of the converter and a first node. The second resistor is connected between the first node and a second node. The error amplifier is coupled to receive a voltage divided by the first resistor and the second resistor to compare to a reference voltage. The sense resistor is connected between the second node and ground. The diode is connected between the output node of the converter and a first node.

The converter is a Sepic converter or a buck converter. The diode is a zener diode. The switch is a NMOS transistor.

Figure 1:
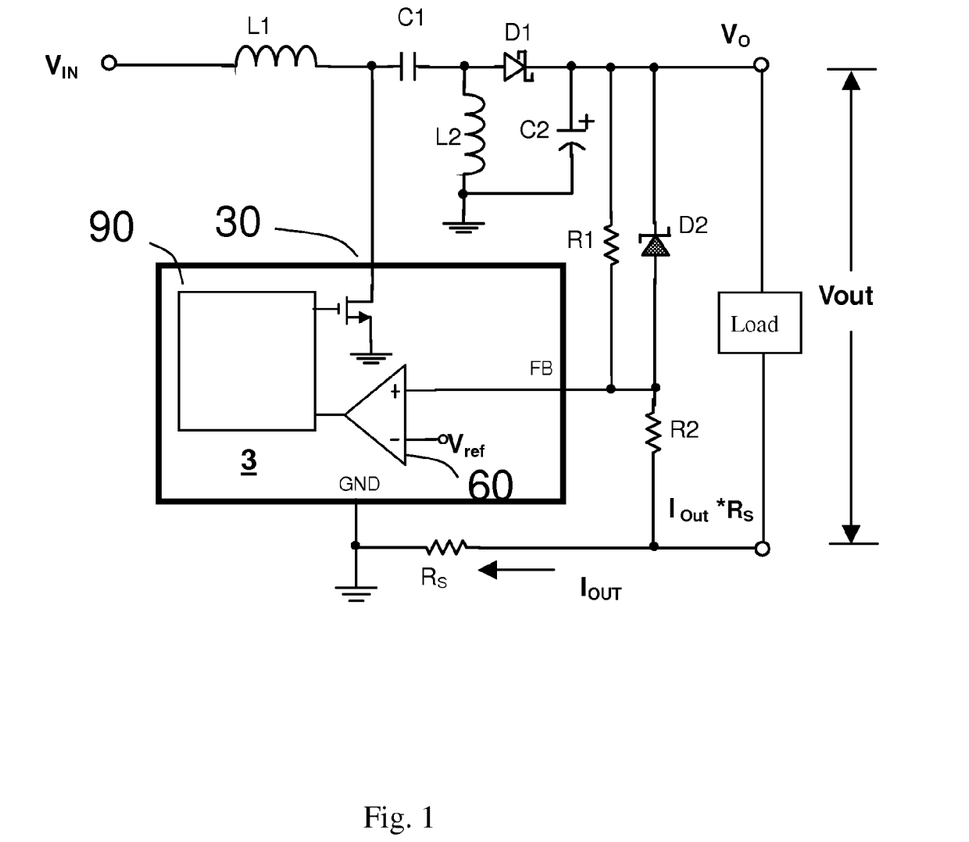
FIG. 1 shows a schematic diagram of a USB charger circuit of the first preferred embodiment according to the present invention.

Referring to FIG. 1, a schematic diagram of a USB charger circuit of the first preferred embodiment according to the present invention is shown. The USB charger circuit of the present invention includes at least a control chip 3, a SEPIC, a first resistor R1, a second resistor R2, a sense resistor Rs and a diode D2. The SEPIC comprises inductors L1 and L2, capacitors C1 and C2, a diode D1 and a transistor 30.

The transistor 30 is configured in the control chip 3. The control chip 3 provides switching and output voltage regulation. The control chip 3 comprises a control circuitry 90 and an error amplifier 60. The transistor 30 is coupled to the control circuitry 90 to serve as a switch. The control circuitry 90 produces constant frequency pulse width modulated drive signal to the transistor 30.

The first resistor R1 is connected between the output node N0 of the converter and a first node N1. The second resistor R2 is connected between the first node N1 and a second node N2. The error amplifier 60 is coupled to receive a voltage divided by the first resistor R1 and the second resistor R2 to compare to a reference voltage Vref. The sense resistor Rs is connected between the second node N2 and ground. The diode D2 is connected between the output node N0 of the converter and a first node N1.

Figure 2:
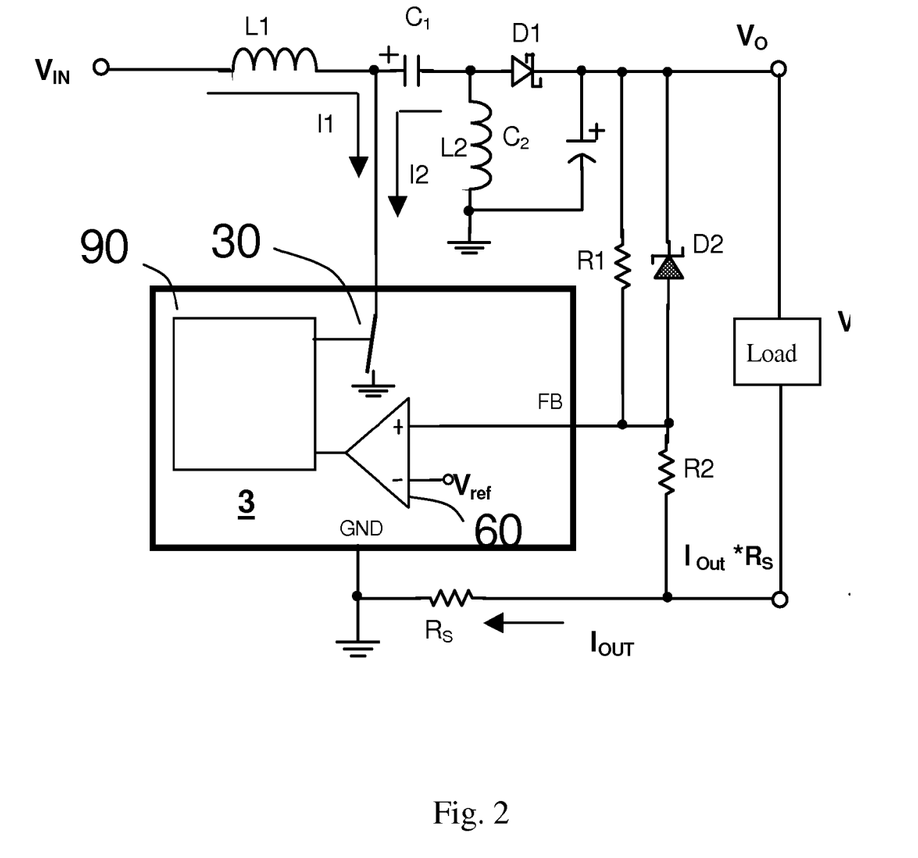
FIG. 2 shows an application of the USB charger circuit of the first embodiment according to the present invention.

The inductor L1 is connected between an input voltage Vin and the transistor 30. Referring to FIG. 2, an application of the USB charger circuit of the first embodiment according to the present invention is shown. When the transistor 30 turns on, the current I1 is flowed through the inductor L1 and the transistor 30, the current I2 is flowed from the capacitor C1 through the transistor 30 and the inductor L2 as well. The inductor L1 and the inductor L2 are charged.

Figure 3:
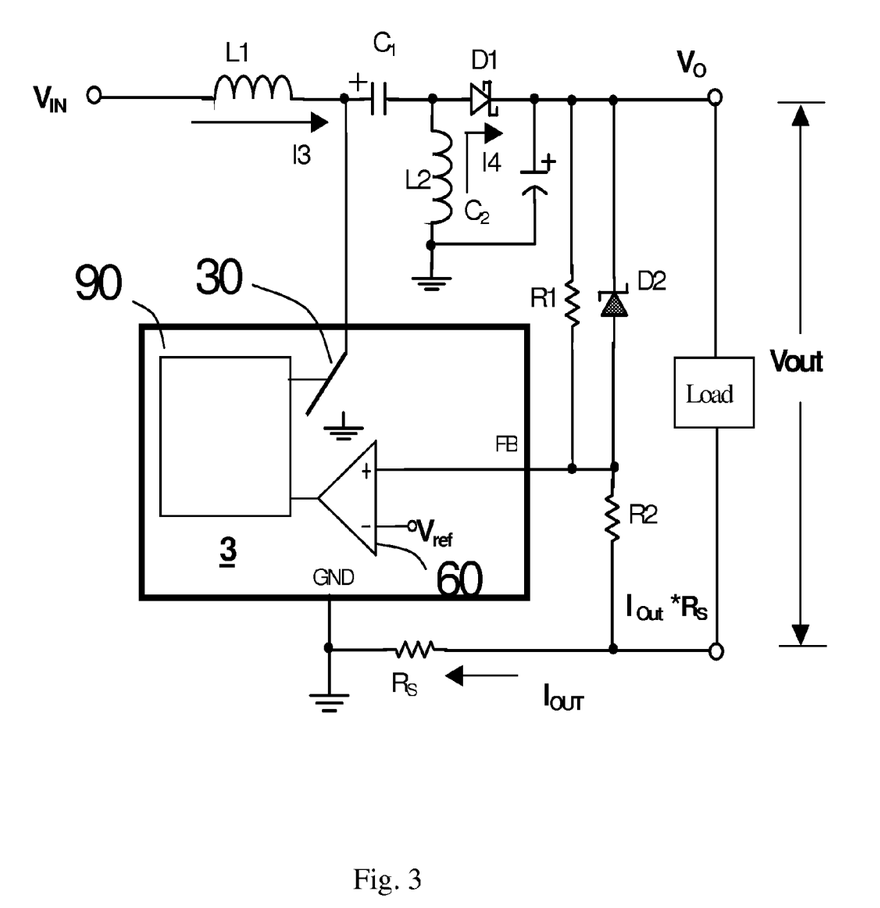
FIG. 3 shows another application of the USB charger circuit of the first embodiment according to the present invention.

Refer to FIG. 3, another application of the USB charger circuit of the first embodiment according to the present invention is shown. When the transistor 30 turns off, the inductor L1 is discharged into the capacitor C1 and C2. In the same way, the inductor L2 is discharged into the capacitor C2. The energy stored in the inductor L1 and the inductor L2 is released to produce the current I3 and current I4 flowing through the diode D1 to charge the capacitor C2 to produce a node voltage Vo to the load 10. The value of the output voltage Vout is equal to Vo−Iout*Rs.

The resistors R1 and R2 are connected between the output node N0 and the second node N2 to produce a voltage by dividing the output voltage Vout. The produced voltage is applied to one input of the error amplifier 60 which compares the voltage to a reference voltage Vref. The value of the output voltage Vout is (Vref−Iout*Rs)*(1+R1/R2). The zener diode D2 is used to limit the output voltage Vout to a maximum voltage. The maximum voltage will not exceed the sum of the reference voltage Vref and zener breakdown voltage Vd2.

Figure 4:
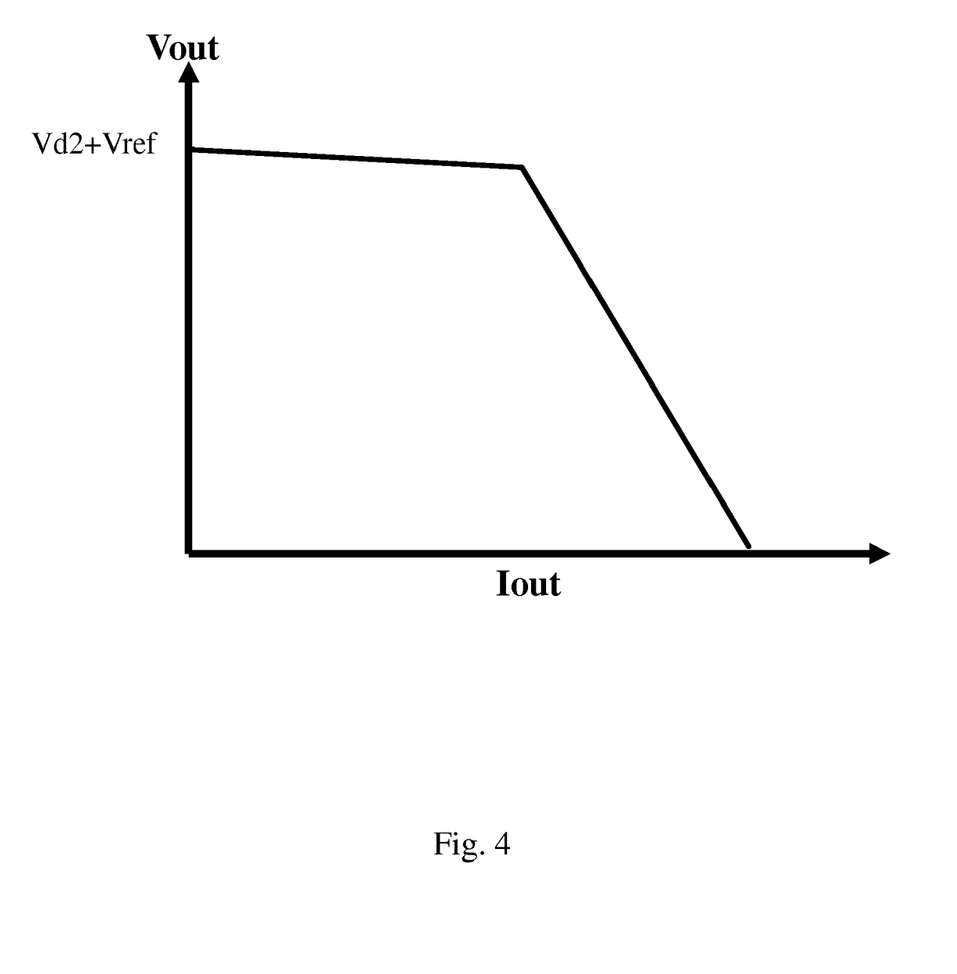
FIG. 4 shows a Vout vs. Iout diagram of the first embodiment according to the present invention.

Refer to FIG. 4, a Vout vs. Iout diagram of the first embodiment according to the present invention is shown. The output voltage Vout is changed in accordance with the value of the current Iout. While the value of the current Iout is zero, the value of the output voltage Vout is equal to the value of the node voltage Vo. The output voltage Vout on a transition point will be reduced by a factor of −Rs*(1+R1/R2).

According to the second preferred embodiment of the present invention, another USB charger circuit comprises a converter, a control circuitry, a first resistor, a second resistor, an error amplifier, a sense resistor, an off-state resistor, a first diode, a second diode, a third resistor and a second transistor. The converter has a first transistor. The control circuitry is coupled to the first transistor. The control circuitry produces a drive signal to the first transistor. The first resistor is coupled between an output node of the converter and a first node. The second resistor is coupled between the first node and a second node. The error amplifier is coupled to receive a voltage divided by the first resistor and the second resistor to compare to a reference voltage. The sense resistor is coupled between the second node and a third node. The off-state resistor is coupled between the third node and ground. The first diode is coupled between the output node of the converter and a first node. The second diode is coupled between the output node of the converter and a forth node. The resistor is coupled between the forth node and ground. The second transistor has a gate coupled to the forth node, a source coupled to ground, and a drain coupled to the third node.

The converter is a Sepic converter or a buck converter. The first diode is a zener diode. The second diode is a zener diode. The first transistor is a NMOS transistor. The second transistor is a NMOS transistor.

Figure 5:
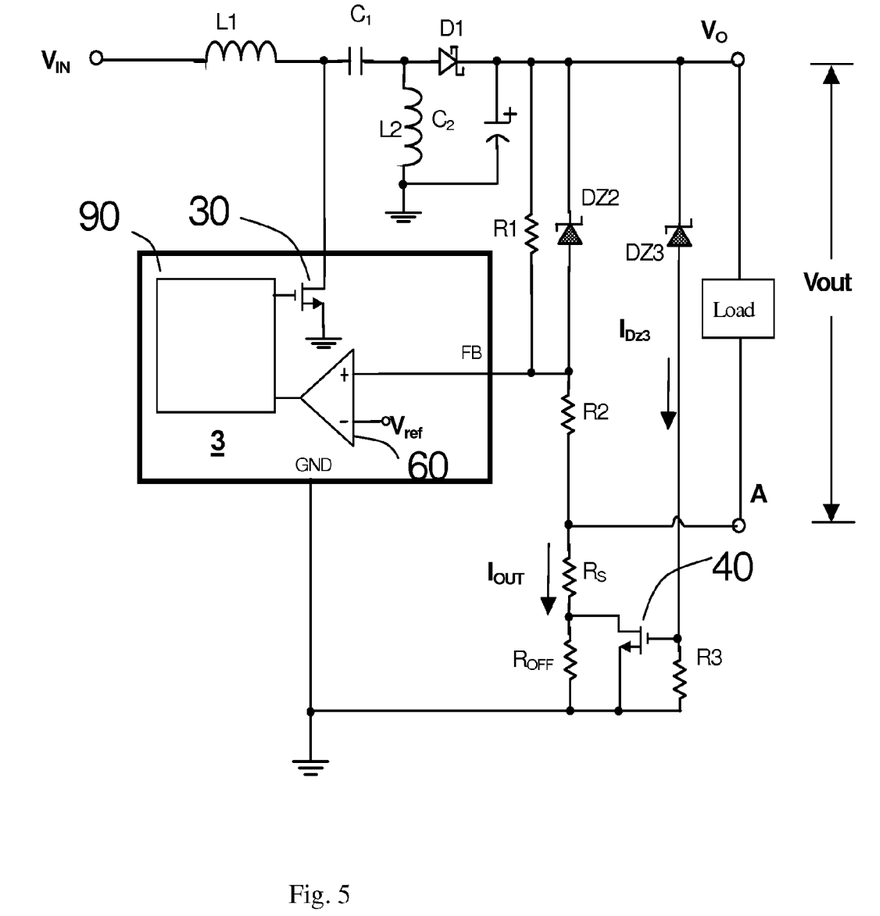
FIG. 5 shows a schematic diagram of a USB charger circuit of the second preferred embodiment according to the present invention.

Please refer to FIG. 5, a second embodiment of the present invention comprises inductors L1 and L2, capacitors C1 and C2, a diode D1, zener diodes DZ2 and DZ3, a transistor 40 and resistors R1, R2, R3, Rs, and ROFF is shown. Also, a control chip 3 with a control circuitry 90 is shown. The control chip 3 has a transistor 30 and an error amplifier 60 configured therein. The control chip 3 provides switching and output voltage regulation. The control circuitry 90 produces constant frequency, pulse width modulated drive to the transistor 30. The inductor L1 is connected between an input voltage Vin and the transistor 30. The transistor 30 is connected to serve as a switch. The current Iout is flowed through a load 10 and into a node A.

The zener diode DZ3 is used to limit the output voltage Vout driving capability. The driving current will be greatly decreased when the node voltage Vo is lower than the sum of the zener breakdown voltage Vdz3 and transistor 40 threshold voltage Vth40. When Vout is higher than the sum of the zener breakdown voltage Vdz3 and transistor 40 threshold voltage Vth40, the zener diode DZ3 turns on, the current Idz3 is flowed through the zener diode DZ3 and the resistor R3. The transistor 40 is turned on and the resistors ROFF is short circuited by transistor 40. The description may be referred to FIG. 2 and FIG. 3.

Figure 6:
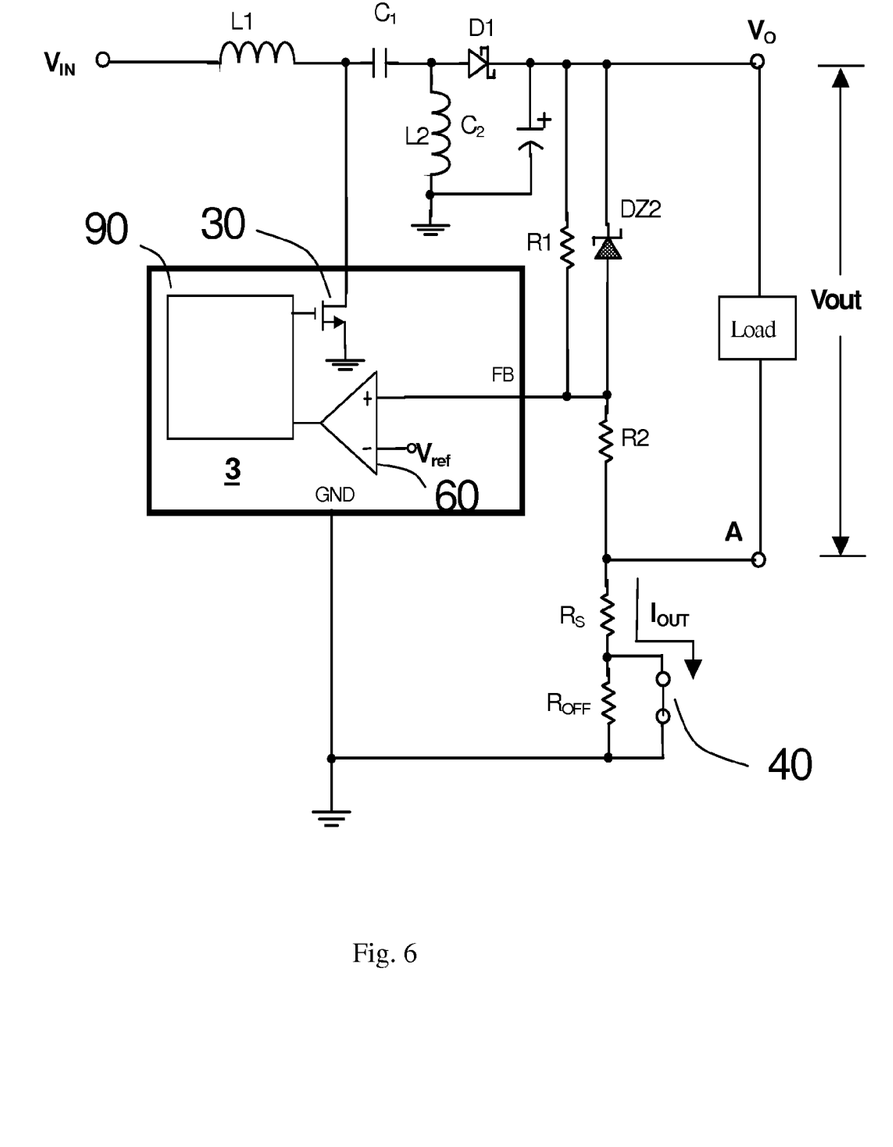
FIG. 6 shows an application of the USB charger circuit of the second embodiment according to the present invention.

Please refer to FIG. 6, an application of the second embodiment of the present invention is shown. While the value of the node voltage Vo is higher than the value of the zener breakdown voltage Vdz3, the resistor ROFF was short circuited by the transistor 40 and the current Iout is flowed through the load 10 and the resistor Rs. The value of the voltage of the node A is Iout*Rs. The value of the output voltage Vout is (Vref−Iout*Rs)*(1+R1/R2).

Figure 7:
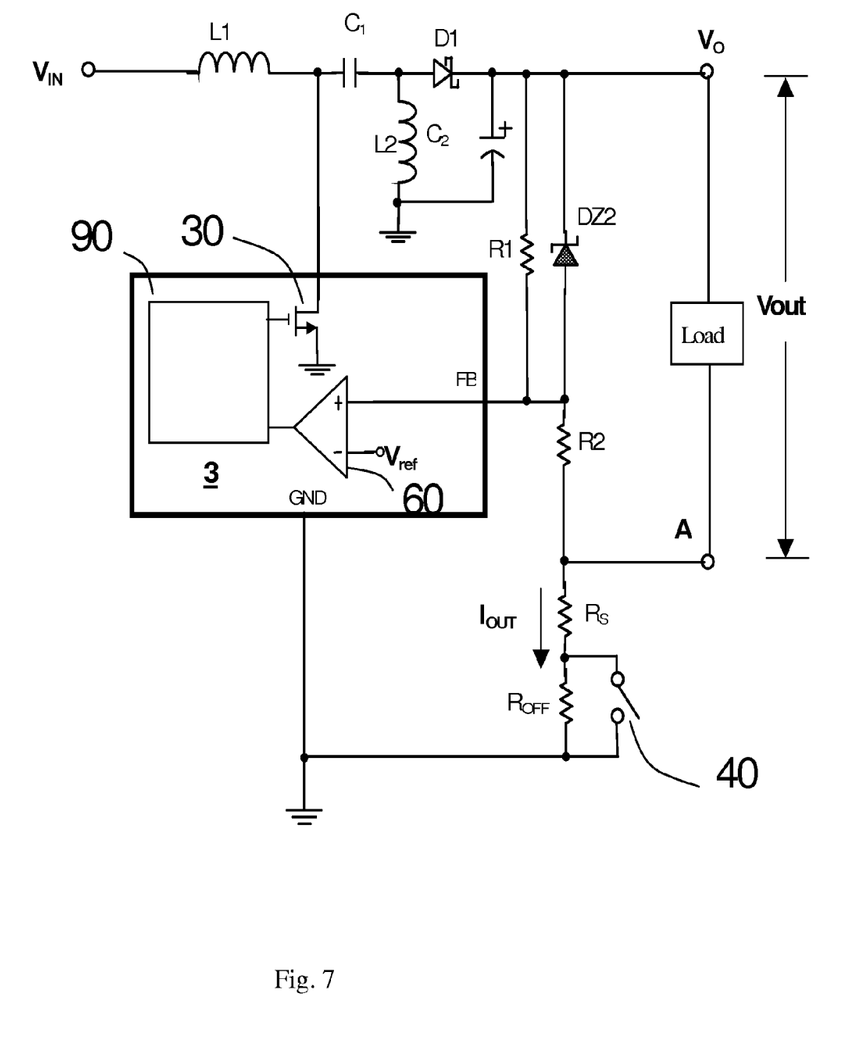
FIG. 7 shows another application of the USB charger circuit of the second embodiment according to the present invention.

Please refer to FIG. 7, another application of the second embodiment of the present invention is shown. While the value of the node voltage Vo is lower than the value of the zener breakdown voltage Vdz3, the transistor 40 is turned off and open circuited and the current Iout is flowed through the load 10, the resistors Rs and ROFF. The voltage of the node A is Iout*(Rs+ROFF). The value of the output voltage Vout is (Vref−Iout*(Rs+ROFF))*(1+R1/R2).

Figure 8:
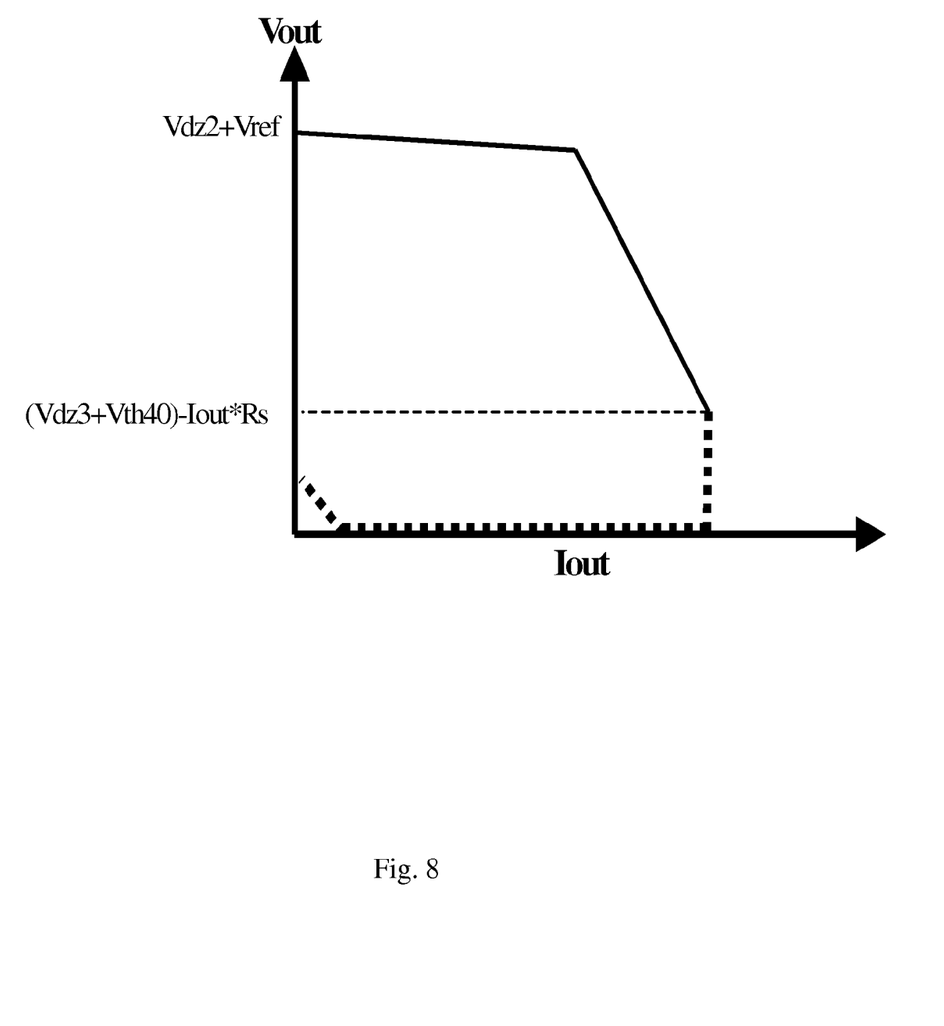
FIG. 8 shows a Vout vs. Iout diagram of the second embodiment according to the present invention.

Please refer to FIG. 8, a Vout vs. Iout diagram of the second embodiment of the present invention is shown. The output voltage Vout is changed in accordance with the value of the current Iout. While the value of the current Iout is zero, the value of the output voltage Vout is equal to the value of the node voltage Vo. The output voltage Vout vs. Iout on a transition point will be reduced by a factor of −Rs*(1+R1/R2). When the Vout voltage is lower than (Vdz3+Vth40)−Iout*Rs, the output voltage Vout vs. Iout will be reduced by a factor −(Rs+ROFF)*(1+R1/R2). Vout is approached to zero at most of Iout value.

According to the third preferred embodiment of the present invention, a further USB charger circuit comprises a converter, a control circuitry, a first resistor, a second resistor, a second transistor, an error amplifier, a sense resistor, a fifth resistor, a first diode, a second diode and a forth resistor. The converter has a first transistor. The control circuitry is coupled to the first transistor. The control circuitry produces a drive signal to the first transistor. The first resistor is coupled between an output node of the converter and a first node. The second resistor is coupled between the first node and a second node. The second transistor has a gate coupled to a forth node, a source coupled to a third node, and a drain coupled to the second node. The error amplifier is coupled to receive a voltage divided by the first resistor and the second resistor to compare to a reference voltage. The sense resistor is coupled between the third node and ground. The fifth resistor is coupled between the first node and ground. The first diode is coupled between the output node of the converter and the first node. The second diode is coupled between the output node of the converter and a forth node. The forth resistor is coupled between the forth node and the third node.

The converter is a Sepic converter or a buck converter. The first diode is a zener diode. The second diode is a zener diode. The first transistor is a NMOS transistor. The second transistor is a NMOS transistor.

Figure 9:
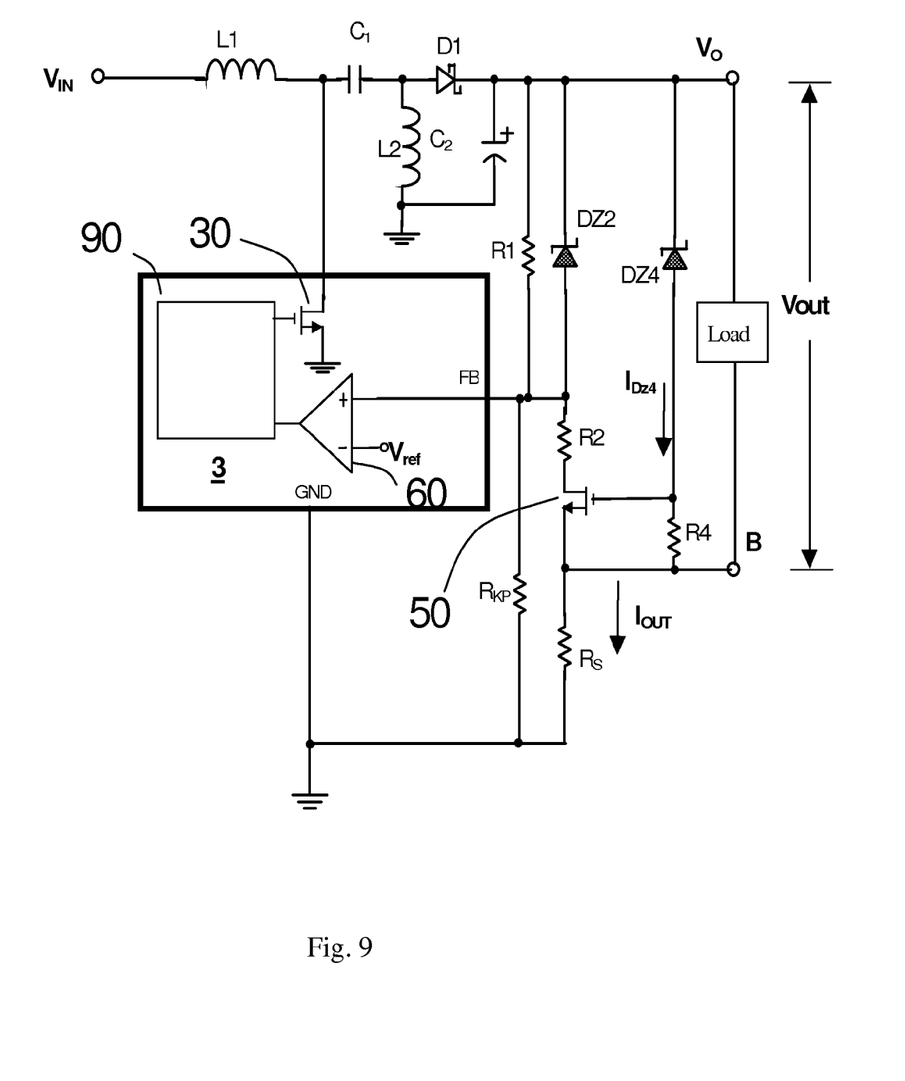
FIG. 9 shows a schematic diagram of a USB charger circuit of the third preferred embodiment according to the present invention.

Please refer to FIG. 9, a third embodiment of the present invention comprises inductors L1 and L2, capacitors C1 and C2, a diode D1, zener diodes DZ2 and DZ4, a transistor 50 and resistors R1, R2, R4, Rs, and RPK is shown. Also, a control chip 3 with a control circuitry 90 is shown. The control chip 3 has a transistor 30 and an error amplifier 60 configured therein. The control chip 3 provides switching and output voltage regulation. The control circuitry 90 produces constant frequency, pulse width modulated drive to the transistor 30. The inductor L1 is connected between an input voltage Vin and the transistor 30. The transistor 30 is connected to serve as a switch. The current Iout is flowed through a load 10 and into a node B.

The zener diode DZ4 is used to limit the node voltage Vo. The voltage will be clamped when the output voltage Vout is lower than the sum of the zener breakdown voltage Vdz4 and transistor 50 threshold voltage Vth50. When Vout is higher than Vdz4+Vth50, then zener diode DZ4 turns on, the current Idz4 is flowed through the zener diode DZ4 and the resistor R4. The transistor 50 is turned on. Since RKP>>(R2+Rs), so the RKP could be eliminated. The description may be referred to FIG. 2 and FIG. 3.

Figure 10:
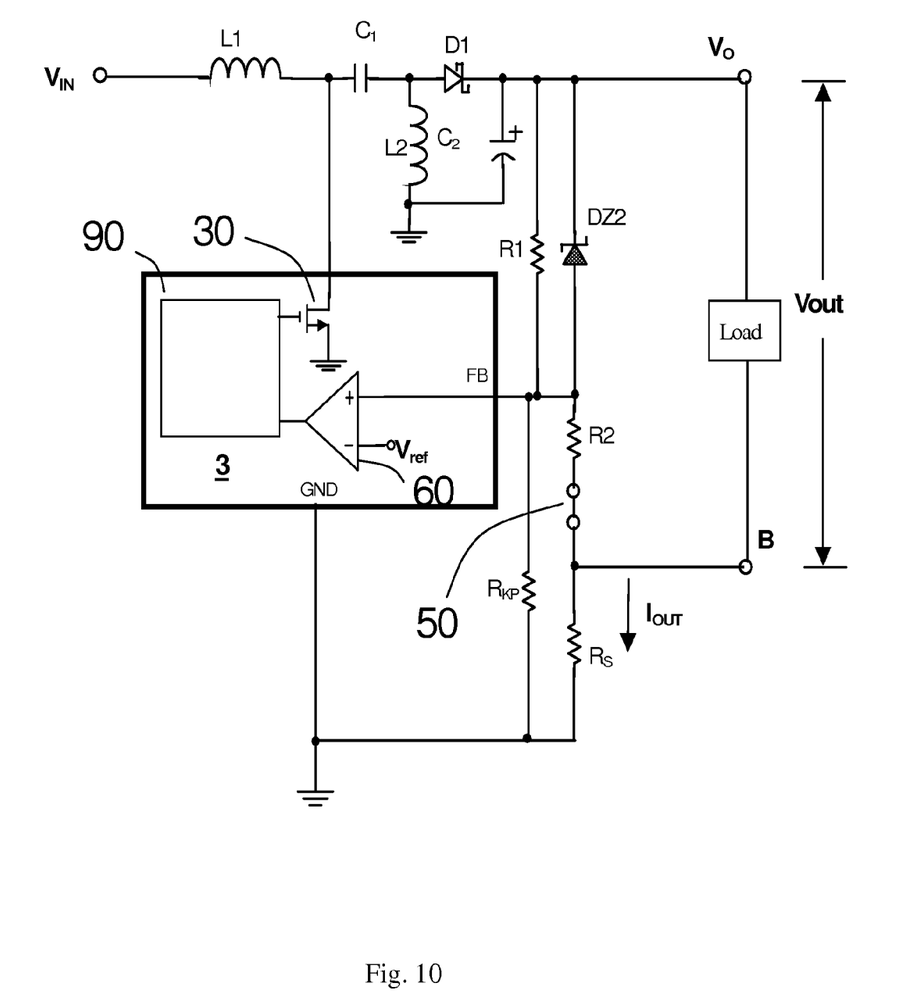
FIG. 10 shows an application of the USB charger circuit of the third embodiment according to the present invention.

Please refer to FIG. 10, an application of the third embodiment of the present invention is shown. While the value of the output voltage Vout is higher than the sum of the zener breakdown voltage Vdz4 and transistor 50 threshold voltage Vth50, the transistor 50 turn on and resistor RKP was eliminated and the current Iout is flowed through the load 10 and the resistor Rs. The value of the voltage of the node B is Iout*Rs. The value of the output voltage Vout is (Vref−Iout*Rs)*(1+R1/R2).

Figure 11:
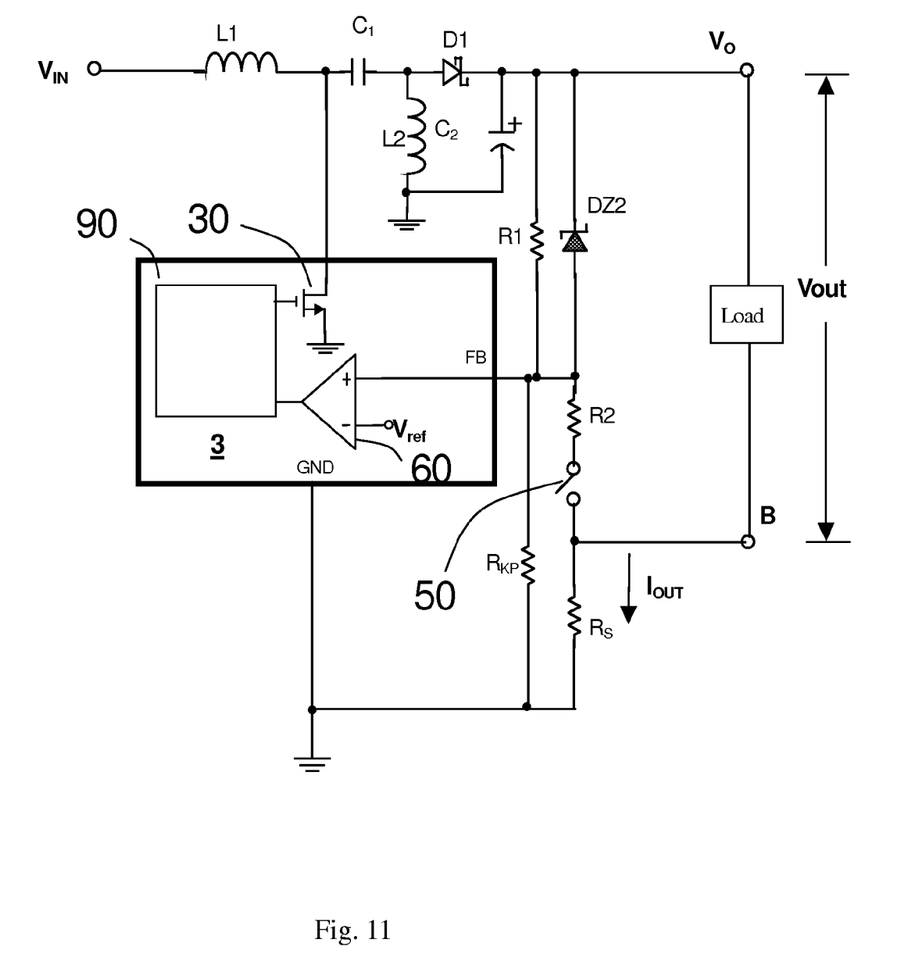
FIG. 11 shows another application of the USB charger circuit of the third embodiment according to the present invention.

Please refer to FIG. 11, another application of the third embodiment of the present invention is shown. While the value of the output voltage Vout is lower than the value of the zener breakdown voltage Vdz4 and transistor 50 threshold voltage Vth50, the transistor 50 turned off become open circuited. The current Iout is flowed through the load 10, the resistors Rs to ground GND. The value of the voltage of the node B is Iout*Rs. The resistors R1 and RPK are connected between the node Vo and ground GND to produce a voltage by dividing the node voltage Vo. The produced voltage is applied to one input of the error amplifier 60 which compares the voltage to a reference voltage Vref. The node voltage Vo is clamped at Vref*(1+R1/RKP). The value of the output voltage Vout is Vref*(1+R1/RKP)−Iout*Rs.

Figure 12:
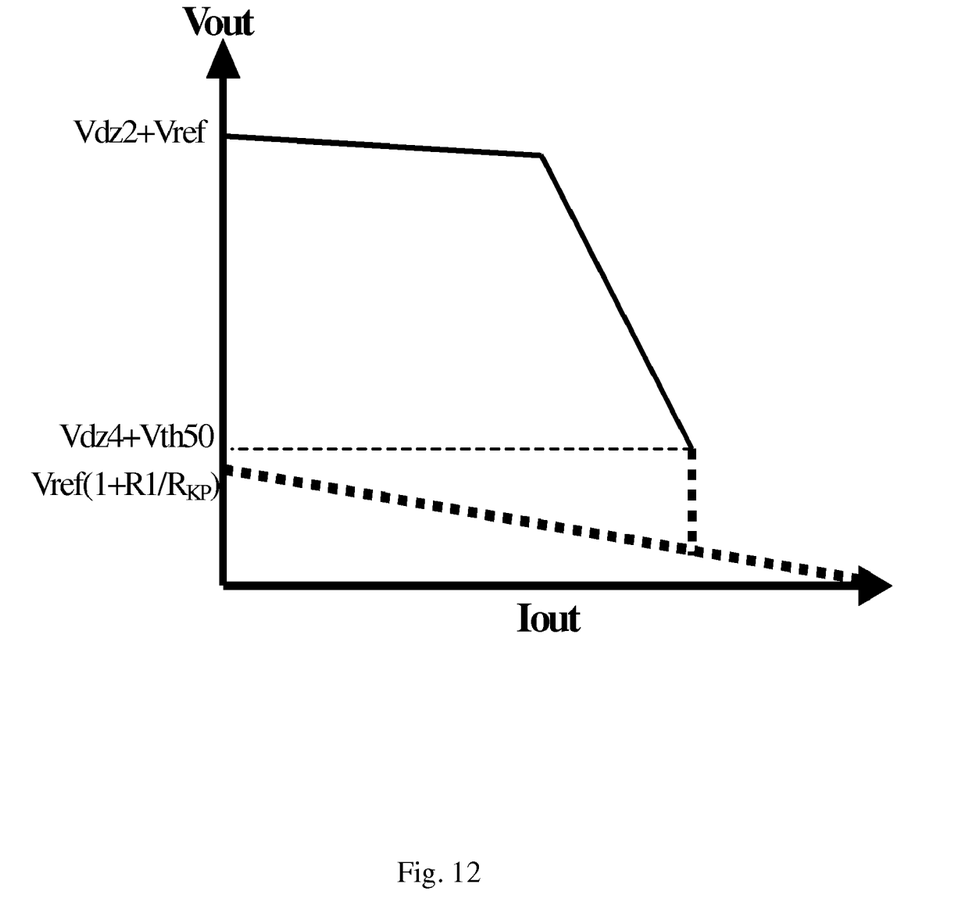
FIG. 12 shows a Vout vs. Iout diagram of the third embodiment according to the present invention.

Please refer to FIG. 12, a Vout vs. Iout diagram of the third embodiment of the present invention is shown. The output voltage Vout is changed in accordance with the value of the current Iout. While the value of the current Iout is zero, the value of the output voltage Vout is equal to the value of the node voltage Vo. The output voltage Vout vs. Iout on the transition point will be reduced by a factor of −Rs*(1+R1/R2). When the Vout voltage is lower than Vdz4+Vth50, the output voltage Vout became Vref*(1+R1/RKP)−Iout*Rs.

The USB charger circuit according to the present invention can clamp the output voltage. The driving capability of the output voltage Vout can be effectively limited. Moreover, the driving current can be greatly decreased.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A USB charger circuit comprising: a converter having a first transistor; a control circuitry coupled to the first transistor, the control circuitry producing a drive signal to the first transistor; a first resistor coupled between an output node of the converter and a first node; a second resistor coupled between the first node and a second node; a second transistor having a gate coupled to a forth node, a source coupled to a third node, and a drain coupled to the second node; an error amplifier coupled to receive a voltage divided by the first resistor and the second resistor to compare to a reference voltage; a sense resistor coupled between the third node and ground; a fifth resistor coupled between the first node and ground; a first diode coupled between the output node of the converter and the first node; a second diode coupled between the output node of the converter and a forth node; and a forth resistor coupled between the forth node and the third node.

2. The USB charger circuit according to claim 1, wherein the converter is a Sepic converter.

3. The USB charger circuit according to claim 1, wherein the converter is a buck converter.

4. The USB charger circuit according to claim 1, wherein the first diode is a zener diode.

5. The USB charger circuit according to claim 1, wherein the second diode is a zener diode.

6. The USB charger circuit according to claim 1, wherein the first transistor is a NMOS transistor.

7. The USB charger circuit according to claim 1, wherein the second transistor is a NMOS transistor.

* * * * *